US 6,703,924 B2

(12) United States Patent
Tecu et al.

(10) Patent No.: US 6,703,924 B2
(45) Date of Patent: Mar. 9, 2004

(54) TACTILE DISPLAY APPARATUS

(75) Inventors: Kirk Tecu, Greeley, CO (US); William Robert Haas, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 106 days.

(21) Appl. No.: 10/027,699

(22) Filed: Dec. 20, 2001

(65) Prior Publication Data

US 2003/0117490 A1 Jun. 26, 2003

(51) Int. Cl.⁷ .................................................. H04B 3/36
(52) U.S. Cl. .................................. 340/407.1; 340/407.2
(58) Field of Search ........................... 340/407.1, 407.2, 340/825.19; 345/157, 163, 173, 174; 343/112, 113, 114

(56) References Cited

U.S. PATENT DOCUMENTS

| | | | |
|---|---|---|---|
| 4,875,185 A | 10/1989 | Bornschein | 364/900 |
| 4,985,692 A | 1/1991 | Breider et al. | 340/407.1 |
| 5,736,978 A * | 4/1998 | Hasser et al. | 345/173 |
| 5,912,660 A * | 6/1999 | Gouzman et al. | 340/825.19 |
| 5,973,670 A * | 10/1999 | Barber et al. | 345/157 |
| 6,059,575 A | 5/2000 | Murphy | 434/112 |
| 6,255,938 B1 | 7/2001 | Bornschein | 340/407.1 |
| 6,278,441 B1 * | 8/2001 | Gouzman et al. | 340/825.19 |

OTHER PUBLICATIONS

Sighted Electronics, Inc., "Braillex; Two Dimensional Braille Displays From Papenmeier"; "Braillex ElL 2D–80; The summit in Efficiency" —2000; 6 pages.

* cited by examiner

*Primary Examiner*—Van T Trieu

(57) ABSTRACT

A tactile display reads out information corresponding to at least a portion of an image appearing on a computer screen comprising a 2-dimensional array of pixels. The tactile display comprises at least one array of tactile output elements, each element corresponding to at least one pixel of the computer screen image and movable, in response to an input representative of a value of a property of the at least one pixel, to a predetermined one of a plurality of discrete, tactilely-recognizable positions. The positions of the plurality of tactile output elements provide a tactilely-recognizable pattern representative of the information on the screen. A touch sensor may be operatively associated with at least one of the tactile output elements to provide an output in response to a user's touch of the associated tactile output element.

25 Claims, 3 Drawing Sheets

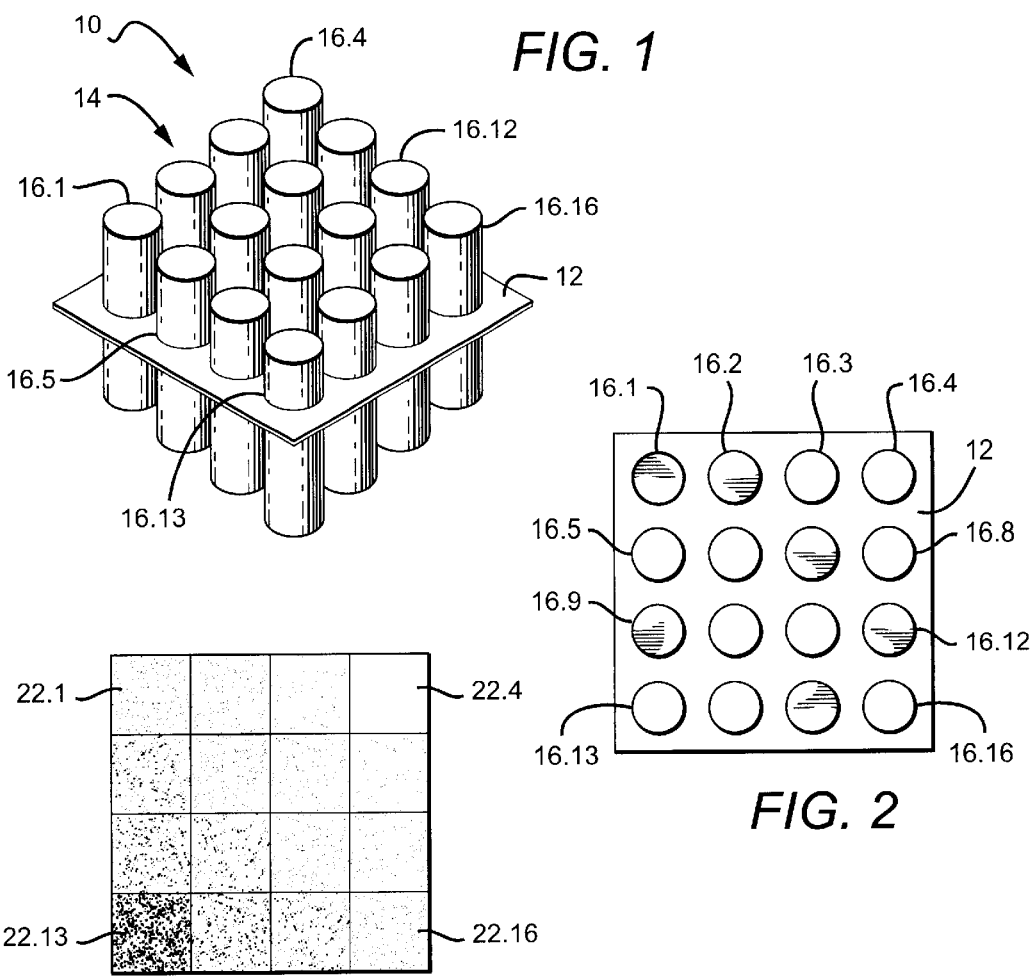
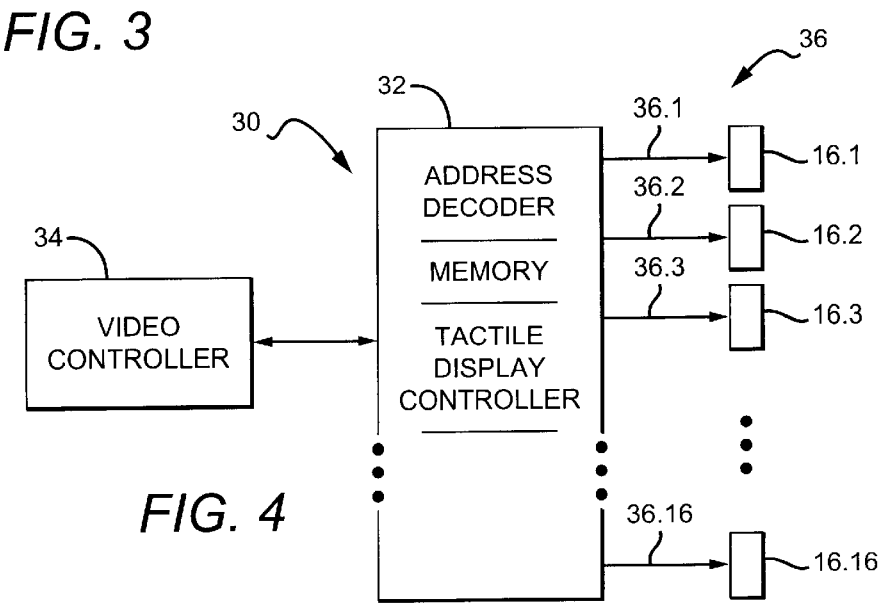

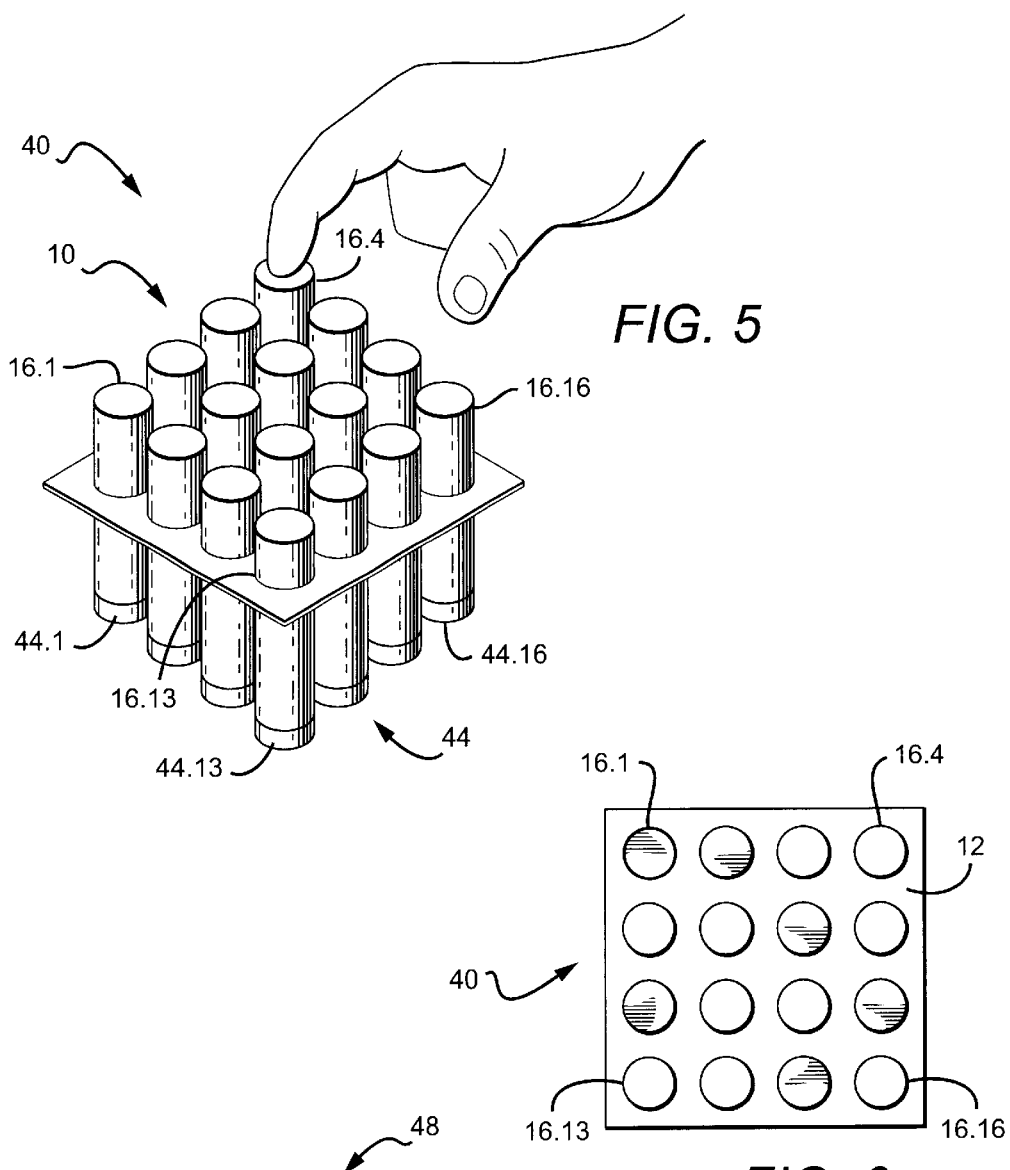

TACTILE DISPLAY APPARATUS

FIELD OF THE INVENTION

The present invention relates generally to computer read-out devices, and more particularly, to tactile displays enabling users to read out information appearing on a computer screen.

BACKGROUND OF THE INVENTION

Presently-available Braille readers permit visually-impaired persons to read text appearing on a computer screen by converting the ASCII code for each text character into a Braille character. A Braille reader may incorporate 40 or 80 "cells" each including pins movable up or down for forming the Braille characters. In this fashion, the computer user is provided with tactile feedback, via Braille, representative of text lines on the screen.

SUMMARY OF THE INVENTION

In accordance with one specific, exemplary embodiment of the invention, there is provided a tactile display for reading out information corresponding to at least a portion of an image appearing on a computer screen comprising a 2-dimensional array of pixels. The tactile display comprises a plurality of tactile output elements arranged in a 2-dimensional array. Each of the plurality of output elements corresponds to at least one pixel of the computer screen and is movable, in response to an input representative of a value of a property of the at least one pixel, to a predetermined one of a plurality of discrete, tactilely-recognizable positions. The positions of the plurality of tactile output elements provide a tactilely-recognizable pattern representative of said information.

Pursuant to another specific, exemplary embodiment of the invention, there is provided a tactile display comprising a plurality of tactile output elements. Each of the elements corresponds to at least one pixel of a computer screen image and is movable to one of a plurality of tactilely-recognizable positions, each position being representative of an n-bit gray scale value of said at least one pixel. The positions of the plurality of tactile output elements provide tactilely-recognizable information relating to the computer screen image.

BRIEF DESCRIPTION OF THE DRAWINGS

The foregoing and other objects, features and advantages of the invention will be evident to those skilled in the art from the detailed description, below, taken together with the accompanying drawings, in which:

FIG. 1 is a simplified, perspective view of a portion of a tactile display in accordance with a specific, preferred embodiment of the invention;

FIG. 2 is a top plan view of the portion of the tactile display shown in FIG. 1;

FIG. 3 is a schematic representation of a portion of a computer screen;

FIG. 4 is a block diagram of a preferred embodiment of a system for controlling the tactile display shown in FIGS. 1 and 2;

FIG. 5 is a simplified, perspective view of a portion of a tactile display in accordance with another, specific, preferred embodiment of the invention;

FIG. 6 is a top plan view of the portion of the tactile display shown in FIG. 5;

FIG. 8 is another schematic representation of a portion of a computer screen.

DETAILED DESCRIPTION OF THE PREFERRED EMBODIMENTS

Figure 7:
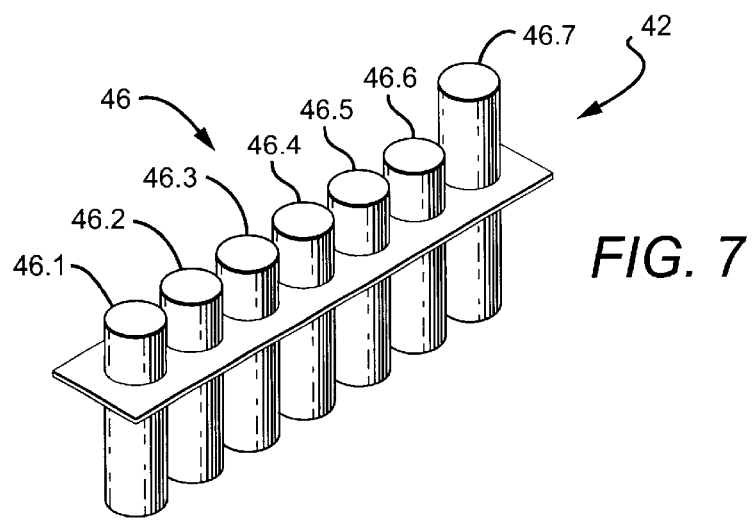
FIG. 7 is a simplified, perspective view of a supplemental tactile display in accordance with yet another, specific, preferred embodiment of the invention.

As far as is known, other than Braille readers which convert ASCII text into Braille characters, there are no displays providing tactile feedback representative of images appearing on a computer screen. Thus, presently there is no way for a visually impaired computer user to conceptualize the organization of a screen to determine, for example, that a window in a GUI environment is open, where it is positioned on the screen, and so forth. By providing such information to the user, a better understanding of the computer's environment would be gained thus increasing working speed and promoting more efficient computer operation.

FIGS. 1 and 2 are perspective and top plan views, respectively, of a representative portion of a tactile display 10 in accordance with a first preferred embodiment of the invention for reading out an image appearing on a computer screen. As is well-known, such a computer screen comprises a 2-dimensional array of pixels, for example, 800×600 pixels, the brightness, color, and so forth, of each of which is controlled by a video controller forming part of the computer system.

By way of example and not limitation, in plan view the tactile display 10 may measure about 9 inches by 11 inches. The tactile display 10 comprises a panel 12 carrying tactile output means 14 comprising a plurality of tactile output elements collectively referred to by the reference numeral 16, arranged in a 2-dimensional array. The representative portion of the tactile display 10 shown in FIGS. 1 and 2 has sixteen tactile output elements 16.1 through 16.16. Each of the plurality of output elements 16 may correspond to a single pixel on the computer screen although, from a practical standpoint, it is preferable that each of the elements 16 corresponds to a number of pixels grouped within a zone. For example, a zone may comprise a subarray of 4×4 pixels so that for an 800×600 pixel screen the tactile output means 14 will comprise a 200×150 array of tactile output elements 16, consistent with the aspect ratio of the screen.

Each of the plurality of output elements 16 is movable, in response to a value of a property of a pixel or a group of pixels within a zone, to a predetermined one of a plurality of discrete, tactilely-recognizable positions. For example, the property may be pixel brightness in which case what is displayed on the screen can be represented as an n-bit gray scale image. Thus, a four-bit gray scale provides sixteen gray scale levels or values ranging from 0000 representing the darkest pixel intensity to 1111 representing the brightest pixel intensity. Where each tactile output element corresponds to a subarray of pixels, brightness values of the pixels in each subarray can be averaged to provide a single value representative of the pixel brightness level of the zone.

In accordance with the preferred embodiment of the tactile display, the representative portion of which is shown in FIGS. 1 and 2, each of the plurality of tactile output elements 16 is vertically movable to a discrete predetermined position in response to the value of the selected pixel property such as intensity or brightness. Thus, for a four-bit gray scale, each of the tactile output elements 16 will have sixteen discrete positions along its vertical travel, each position corresponding to a specific gray scale level of the individual pixel or group of pixels. Thus, for a gray scale level or value of 0000 (darkest) the corresponding one of the tactile output elements 16 would be driven to its lowest level while for a gray scale level or value of 1111 (brightest) the corresponding one of the tactile output elements 16 would be driven to its fully extended vertical position. Obviously, intermediate gray scale levels or values would drive the corresponding tactile output elements to corresponding vertical positions intermediate the lowest and highest levels. Linear stepper mechanisms having plungers that may be driven to discrete positions that can serve as the tactile output elements 16 are commercially available from, for example, Haydon Switch and Instrument, Inc., Waterbury, Conn., U.S.A. These mechanisms have very small form factors so that it is possible to package them in a dense, 2-dimensional array.

FIG. 3 shows a representative portion of a computer screen 20 divided into pixel zones collectively identified by the reference numeral 22. The portion of the screen shown in FIG. 3 comprises sixteen zones 22.1, 22.2, 22.3, and so forth. Each zone, in accordance with one specific, exemplary embodiment, comprises a 4×4 pixel subarray and corresponds to one of the tactile output elements 16. Thus, pixel zone 22.13 (dark) corresponds to the tactile output element 16.13 shown in its lowest position, while pixel zone 22.4 (bright) corresponds to the tactile output element 16.4 shown in its highest position. The remaining tactile output elements 16 are in various positions proportional to the brightness levels of the computer screen zones 22 to which they correspond. It will thus be seen that a 3-dimensional contour or profile representing the brightness intensities of various portions of the image on the computer screen 20 are mapped to the tactile display 10 so that a user sensing by touch the heights of the various tactile output elements 16 will gain a better perception of the layout of the screen the user is trying to navigate.

FIG. 4 is a greatly simplified block diagram of a system 30 for driving the tactile display elements 16 to various levels in accordance with the values of the pixel property of interest. The drive system 30 is similar to those used to control tactile displays providing feedback, via Braille, representative of text fields on the screen. An interface, represented by the block 32, includes an address decoder, a memory, and a tactile display controller. The interface 32 communicates with the computer video controller 34 via a system bus. The interface 32 comprises outputs 36, individual ones of which, namely, outputs 36.1, 36.2, and so forth, are connected to corresponding ones of the various tactile output elements 16.1, 16.2, and so forth, for driving each element to a discrete, predetermined position indicative of the value of the pixel property.

With reference to FIGS. 5–9, there is shown an alternative, preferred embodiment of the present invention comprising a tactile display for reading out information relating to an image appearing on a computer screen comprising a 2-dimensional array of pixels. The tactile display of the alternative preferred embodiment comprises a main tactile display 40 (FIGS. 5 and 6) and a supplemental tactile display 42 (FIG. 7). Although the drawings show the displays 40 and 42 as separate units, it will be obvious that they may be combined or integrated into a single unit.

The main tactile display 40 provides to the user a tactilely recognizable pattern based on values of a first property (such as brightness) of the pixels defining the screen image while the supplemental tactile display 42 operating in synchronization with the main display provides the user with additional information relating to a second property, such as color, of the image-defining pixels.

The main tactile display 40 incorporates a tactile display 10 identical to that shown in FIGS. 1 and 2. Accordingly, the tactile display 10 of the main display 40 comprises a panel 12 carrying tactile output means 14 in turn comprising a plurality of tactile output elements 16, that is, elements 16.1, 16.2, and so forth, arranged in a 2-dimensional array, as already described. Also as already noted, each of the output elements 16 is movable, for example, vertically, in response to a value of a property (for example, brightness) of a pixel or, preferably, a group of pixels occupying a zone of the computer screen, to a predetermined one of a plurality of discrete, tactilely recognizable positions. The main tactile display 40 thus presents a 3-dimensional pattern or contour that a user can sense by touch, the contour being representative of information pertaining to the image on the computer screen.

Associated with the tactile output elements 16 of the main display 40 are touch sensors collectively identified by the reference numeral 44. Each of the touch sensors 44 provides an output responsive to a user's touch of the associated tactile output element. Thus, as the user touches each of the various tactile output elements 16.1, 16.2, and so forth, of the main tactile display 40 to discern the contour or pattern thereof, each of the associated touch sensors 44.1, 44.2, and so forth, provides an output indicative of the location or address of the individual tactile output elements being touched. The touch sensors 44 may comprise any kind of pressure responsive transducers, individual ones of which may be attached to individual ones of the tactile output elements or they may be in the form of a pad with pressure sensitive piezoelectric areas underneath the tactile output element array of the main display.

The touch sensors 44 control an array 46 of movable tactile output elements 46.1, 46.2, and so forth, carried by the supplemental tactile display 42. By way of example and not limitation, the movable tactile output elements 46 of supplemental tactile display 42 may comprise linear stepper motors including plungers movable vertically to one of a plurality of discrete, tactilely recognizable positions representing the value of a second property or quality of the pixel (or group of pixels) corresponding to the tactile output element on the main tactile display 10 touched by the user. Where the first-mentioned property may be brightness, the second property may be color. Using both hands, the user can simultaneously sense the main tactile display 40 and the supplemental tactile display 42. Alternatively, the user can sense the displays 40 and 42 sequentially using only one hand.

Like the main tactile display 40, the supplemental display 42 may comprise a dense, 2-dimensional array of tactile output elements each having a plurality of discrete, predetermined positions. FIG. 7 shows a simpler supplemental tactile display 42 comprising a linear array of seven binary tactile output elements 46 for providing a coarse replica of the color spectrum. Thus, tactile output element 46.1 at one end of the array may represent blue, the center element 46.4 green, and the element 46.7 at the other end of the array, red, with the intermediate elements 46.2, 46.3, 46.5 and 46.6 representing intermediate colors.

FIG. 8 shows a portion of a computer screen 48 including pixel zones 50 comprising individual zones 50.1, 50.2, and so forth.

In the example shown in FIGS. 5, 7 and 8, the user is touching the tactile output element 16.4 on the main display 40; the element 16.4 corresponds to pixel or pixel zone 50.4 on the computer screen 48. The element 16.4 is fully extended indicating to the user that the zone is at the bright limit. The touch sensor 44.4 associated with the element 16.4 is energized by the user's touch causing the supplemental tactile display 42 to provide additional information, for example, the color, of the pixel zone 50.4. In the example presented, the color of the pixel zone 50.4 is red as indicated by the binary tactile output element 46.7 on the supplemental display 42 having moved to its extended position. Thus, by touching the supplemental display 42, the user knows that the pixel zone 50.4 being sensed is bright red.

In one specific, exemplary implementation of the invention, the position of an "in focus" window in a GUI computing environment may be conceptualized by a user and distinguished from other open windows by determining, by touch, that the "in focus" window has a continuous border or perimeter. In aid of such a determination, screen colors can be preadjusted to provide a high degree of contrast between an "in focus" window and other windows appearing on a screen.

Figure 9:
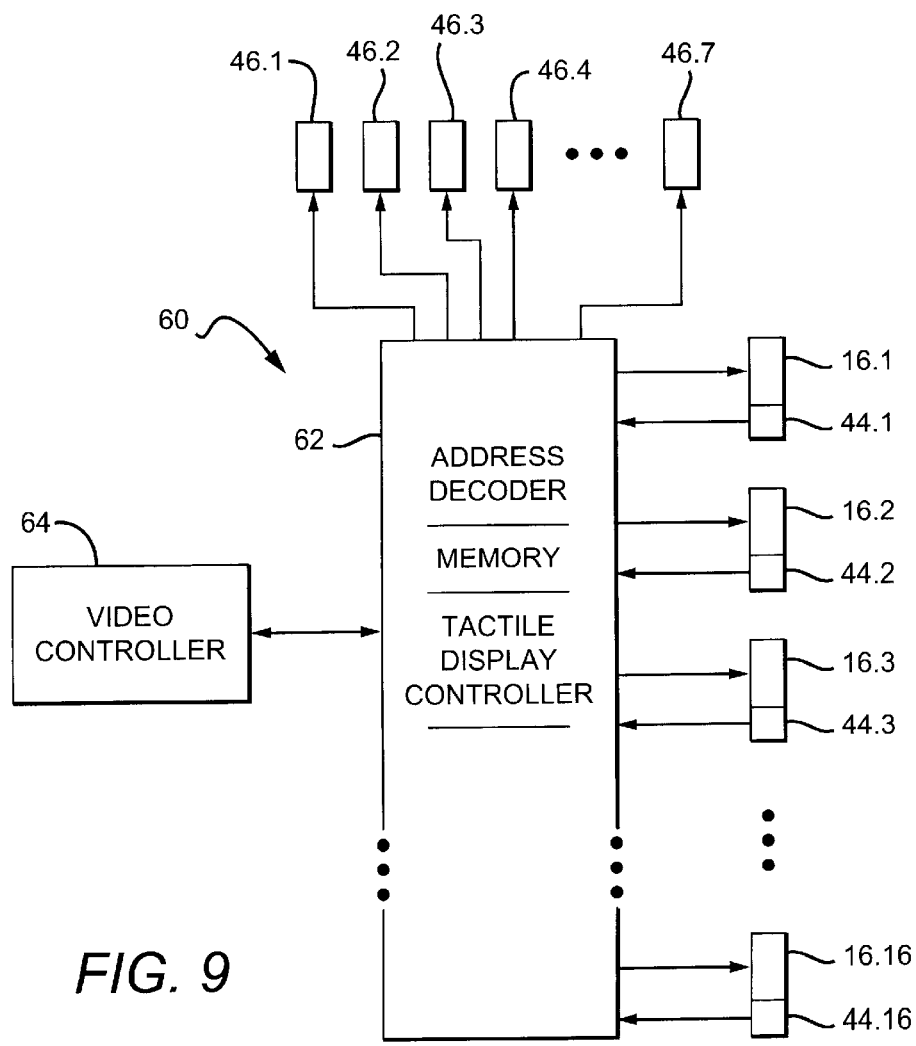
FIG. 9 is a block diagram of a preferred embodiment of a system for controlling the tactile displays shown in FIGS. 5–7.

Appropriate hardware and software including addressing schemes, control algorithms, so forth, for controlling the main and supplemental tactile display elements 40 and 42 will be obvious to those skilled in the art pertaining to readers for displaying, in Braille, lines of text appearing on computer screens and therefore need not be explained in detail. FIG. 9 shows in simplified, schematic form a system 60 for controlling the displays 40 and 42. An interface 62 incorporating suitable address decoders, memory banks and tactile display controllers is connected to the video controller 64 of the computer and receives as inputs signals from the touch sensors 44 indicating which of the tactile output elements 16 on the main tactile display 40 are being touched. The interface 62 provides output drive signals to the tactile output elements 16 and 46 of the main and supplemental displays 40 and 42, respectively, to move the elements to one of their plurality of discrete, predetermined positions indicative of the values of the properties of the associated screen pixel or pixel zone.

What is claimed is:

1. A tactile display for reading out information corresponding to at least a portion of an image appearing on a computer screen comprising a 2-dimensional array of pixels, the tactile display comprising:

a plurality of tactile output elements arranged in an array, each of the plurality of output elements corresponding to at least one pixel of the computer screen and being movable, in response to an input representative of a value of a property of the at least one pixel, to a predetermined one of a plurality of discrete, tactilely-recognizable positions, the positions of the plurality of tactile output elements providing a tactilely-recognizable pattern representative of said information; and a touch sensor operatively associated with at least one of the plurality of tactile output elements, said at least one touch sensor providing an output in response to a user's touch of the associated tactile output element.

2. The tactile display of claim 1 in which:
said at least one touch sensor comprises a pressure responsive transducer.

3. The tactile display of claims 1 in which:
each of the said tactile output elements comprises an extendible plunger movable to said plurality of discrete positions, and wherein each of the tactile output elements is coupled to a corresponding touch sensor.

4. The tactile display of claim 1 further comprising:
a plurality of touch sensors, said plurality of touch sensors comprising a pad of pressure sensitive piezoelectric areas underneath said array of tactile output elements.

5. The tactile display of claim 1 in which:
said output of said at least one touch sensor comprises a signal representative of the location of the associated tactile output element in said array.

6. The tactile display of claim 1 in which:
said value of said property comprises gray scale intensity.

7. The tactile display of claim 1 in which:
each of said plurality of tactile output elements corresponds to a subarray of pixels.

8. The tactile display of claim 7 in which:
each of said plurality of positions of each of said plurality of tactile output elements is representative of an n-bit gray scale value, said n-bit gray scale value being an average of the n-bit gray scale values of the pixels comprising said subarray.

9. The tactile display of claim 1 further comprising:
a second plurality of tactile output elements, each of said second plurality of tactile output elements being movable to a predetermined one of a plurality of discrete, tactilely recognizable positions in response to a value of a second property of the at least one pixel and to said touch sensor output.

10. The tactile display of claim 9 in which:
the first mentioned property of the at least one pixel comprises gray scale intensity; and
said second property of the at least one pixel comprises color.

11. A tactile display for reading out information corresponding to at least a portion of an image appearing on a computer screen comprising a 2-dimensional array of pixels, the tactile display comprising:

a first array of tactile output elements, each element of said first array corresponding to at least one pixel of the computer screen and being movable, in response to an input representative of a value of a first property of the at least one pixel, to a predetermined one of a plurality of discrete, tactilely-recognizable positions, the positions of the plurality of tactile output elements providing a tactilely-recognizable pattern representative of said information; and a second array of tactile output elements, each element of said second array being movable to a predetermined one of a plurality of discrete, tactilely recognizable positions in response to a value of a second property of the at least one pixel.

12. The tactile display of claim 11 in which:
each of the said tactile output elements comprises an extendible plunger movable to said plurality of discrete positions.

13. The tactile display of claim 11 in which:
at least said first array of tactile output elements comprises a 2-dimensional array.

14. The tactile display of claim 11 in which:
the first property comprises gray scale intensity.

15. The tactile display of claim 11 in which:
said plurality of discrete positions of each of the movable output elements of said first array are indicative of an n-bit gray scale intensity of the corresponding at least one computer screen pixel, where n=at least 2.

16. The tactile display of claim 15 in which:

n=4.

17. The tactile display of claim 11 in which:

each of the tactile output elements of at least one of the arrays corresponds to a plurality of pixels of the computer screen image.

18. The tactile display of claim 11 in which:

each of the plurality of tactile output elements of at least one of the arrays corresponds to a subarray of pixels of the computer screen image.

19. The tactile display of claim 18 in which:

the value of the first property of the pixel subarray comprises an average of the values of the first property of the individual pixels comprising the subarray.

20. The tactile display of claim 11 in which:

the second property comprises color.

21. A method of using a tactile display comprising an array of movable tactile elements, each element corresponding to at least one pixel of a computer screen and movable in response to an input to a predetermined one of a plurality of discrete, tactilely-recognizable positions, the method comprising the steps of:

driving at least one of the tactile elements to a tactilely-recognizable position representative of a value of a property of the at least one pixel;

tactilely sensing said position of said at least one tactile element; and generating an output in response to the tactile sensing of the position of said at least one tactile element.

22. The method of claim 21 in which:

the property of said at least one pixel comprises gray scale intensity.

23. The method of claim 21 in which:

said output comprises a signal representative of the address of said at least one tactile element.

24. The method of claim 21 further comprising the steps of:

providing a second array of movable tactile element;

driving at least one of the movable tactile elements of the second array in response to said output to a tactilely-recognizable position representative of the value of a second property of the at least one pixel; and tactilely sensing the position of said at least one tactile element of the second array.

25. The method of claim 24, in which:

the second property is color.

* * * * *